May 14, 1957 L. O. GREELEY 2,792,021
CONTROL VALVES
Filed March 13, 1953 2 Sheets-Sheet 1

INVENTOR
LEO O. GREELEY
BY
ATTORNEY

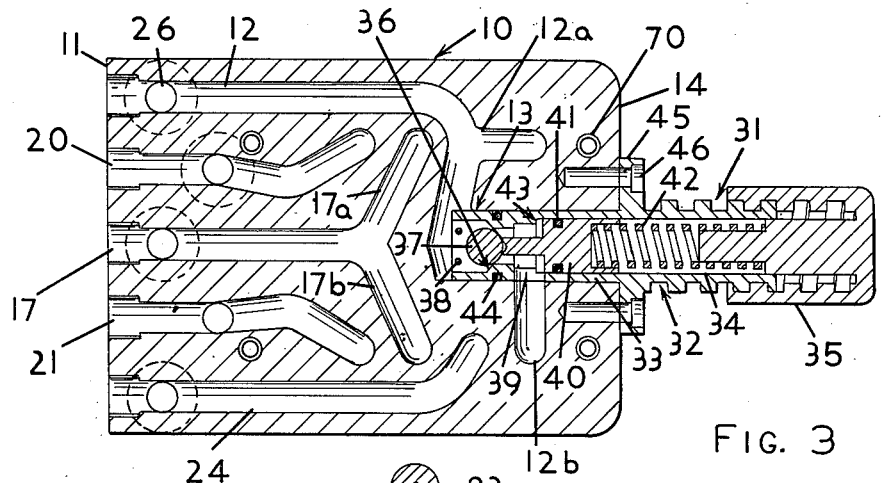

United States Patent Office 2,792,021
Patented May 14, 1957

2,792,021
CONTROL VALVES

Leo O. Greeley, Cadillac, Mich., assignor to F. J. McCarthy, Inc., Cadillac, Mich., a corporation of Michigan Application March 13, 1953, Serial No. 342,235

5 Claims. (Cl. 137—622)

This invention relates to hydraulic valves and more particularly to a slide type valve designed to supply hydraulic fluid from a common source to two pressure consuming devices requiring different operating pressures and one of which is double acting.

The object of my invention is to provide a control valve of simple construction suitable for regulating one or two pressure operated devices such as torque motors or reciprocating pistons. My device is further designed to provide such a valve having incorporated into it an adjustable pressure differential creating valve which will permit one of the devices to be operated at a higher pressure than the other device but with both devices supplied with hydraulic fluid from a single pressure source. A further object of my invention is to provide such a valve which, if necessary, may be readily changed in the field to add or eliminate the pressure differential. Another object of my device is to provide such a valve in which the differential in the pressures may be readily varied without disassembling the valve structure itself.

Another object of my invention includes the provision of a valve in which the actual valving structure may be readily disconnected from the remainder of the valve structure without necessitating the disconnection of numerous hydraulic conduits. It is a still further object of my invention to provide such a valve structure in which the valve operating one of the devices is distinct and independent from the valve operating the other of the devices thus permitting each to be separately removed for quick, simple and inexpensive maintenance or replacement.

These and other objects and purposes of my invention will be immediately seen by those acquainted with the design and construction of hydraulic valves upon reading the following specification and the accompanying drawings.

In the drawings:

Fig. 3 is a sectional view of my improved valve taken along the plane III—III of Fig. 2.

Fig. 4 is a sectional view of my improved valve taken along the plane IV—IV of Fig. 1.

Fig. 6 is an enlarged oblique view of the sliding element in my improved valve.

Fig. 9 is a fragmentary, diagrammatic presentation of a portion of a hydraulic system incorporating my improved valve.

My improved valve consists of a base plate having a group of passages in it, one of which serves as a main supply of hydraulic fluid and one of which serves as a return conduit for hydraulic fluid. To this plate are connected all of the hydraulic conduit lines. The plate at one end has an opening for receiving an insert valve which intercepts the hydraulic supply passage and is capable of shutting off the supply of hydraulic fluid passing to one side of the plate when it exceeds a given pressure. This valve is so designed that it may be readily adjusted without removal from the plate and without disassembly or, if it is desired to eliminate the pressure differential, the valve may be removed and the opening for the valve closed by a cap. The plate makes provision for the quick attachment of a pair of valve assemblies which control the distribution of the hydraulic fluid to the various discharge conduits. These valve assemblies are separate, self contained units and may be attached to or removed from the plate as a unit since they are not attached to any of the fluid lines. The plate is so designed that the identical valve on one side may regulate a reciprocating device while on the other side of the plate may be used to regulate a device operating in one direction only.

Figure 1:
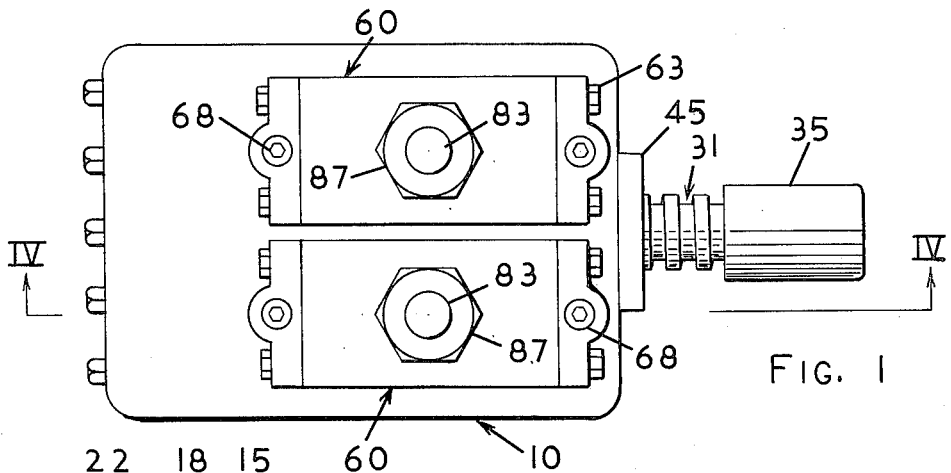
Fig. 1 is a plan view of my improved valve.
Figure 5:
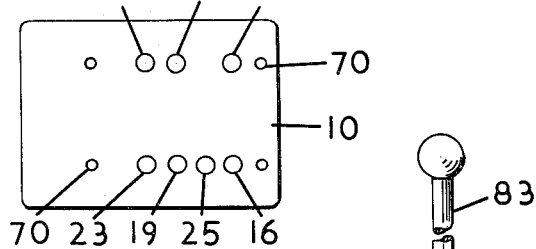
Fig. 5 is a plan view of the base plate portion of my improved valve.

Referring to the drawings in greater detail, the numeral 10 represents a generally rectangular plate having a plurality of passages within it. It is contemplated that the plate will normally be cast and that each of the passages will open through the end 11 of the plate. Adjacent one edge of the plate is the supply passage 12. The supply passage 12 extends into the plate a substantial distance and then turns toward the center of the plate where it communicates with a large valve receiving aperture 13 opening through the opposite end 14 of the plate. Adjacent the point where the passage 12 turns toward the center of the plate and extending parallel to the valve opening 13, the passage 12 has a branch portion 12a communicating with the port 15 opening through the top of the plate (Fig. 5). Communicating with the side of the valve opening 13 is a secondary supply passage 12b extending across the plate and communicating with the port 16 opening through the top of the plate and spaced the same distance from the end 14 of the port 15.

Opening through the center of the end 11 of the plate 10 is the return passage 17. The return passage 17 is substantially Y-shaped and immediately forward of the crosswise extending portion of the passage 12 has a pair of branches 17a and 17b communicating with the discharge ports 18 and 19 respectively. On each side of the passage 17 and opening through the end 11 of the plate 10 is a passage extending a lesser distance into the plate than the passage 17. The first of these passages is the first distribution passage 20 lying between the passage 12 and the passage 17. The second of these is the second distribution passage 21 positioned between the return passage 17 and the hereinafter described third distribution passage. The first distribution passage 20 communicates with the port 22 opening through the top of the plate 10. The second distribution passage 21 communicates with the port 23 opening through the top of the plate 10. On the far side of the plate from the supply passage 12 is a third distribution passage 24. Like the other passages, the third distribution passage 24 opens through the end 11 of the plate 10 and at its other end communicates with the port 25 opening through the top of the plate 10.

The ports 15, 18 and 22 are aligned along an axis parallel and adjacent to one side of the plate 10. The ports 16, 19, 23 and 25 are aligned along a parallel axis adjacent the other side of the plate. The ports 15 and 16 are equally spaced from the end 14 of the plate. Similarly the ports 18 and 19 are spaced a similar distance from this end of the plate. The ports 22 and 23 are spaced an equal distance from this end of the plate. The port 25 has no counterpart on the opposite side of the plate. The purpose of this will appear more fully hereinafter.

Each of the passages 12, 17, 20, 21 and 24, where they open through the end 11 are internally threaded to permit installation of the end of a fluid line or of a plug to seal the opening. Each of these passages is also ported at 26 through the bottom of the plate, the ports in alternate passages being staggered lengthwise of the plate. These ports, like the ones through the end 11, are internally threaded to receive either a fluid conduit or a threaded plug.

Figure 2:
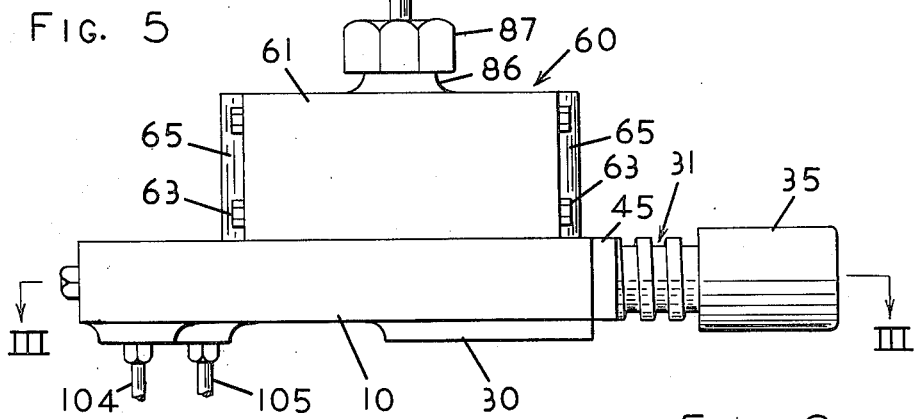
Fig. 2 is a side elevation view of my improved valve.

The lower surface of the plate 10 is dished at 30 (Fig. 2) to provide for the valve receiving opening 13 designed to receive the pressure regulating valve 31. The pressure regulating valve 31 consists of a main tubular housing or shell 32 having a smooth external surface on its inward portion 33 designed to slidably seat into the valve receiving opening 13. The outer portion 34 of the tubular housing 32 is externally threaded to receive the adjustment cap 35.

Figure 8:
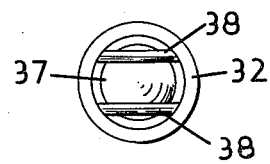
Fig. 8 is an end view of the inside end of the pressure differential valve portion of my improved valve.

The internal opening through the housing 32 is restricted by an internal wall adjacent the inward end of the valve the restricting wall forming a conical valve seat 36 for the ball valve 37. The inward end of the tubular housing forms a chamber for the ball valve 37 from which escape of the ball 37 is prevented by the two bars 38 (Figs. 3 and 8) extending across the mouth of the opening and so spaced that the ball 37 can neither pass around nor between them. Immediately outwardly of the valve seat 36, the interior chamber of the tubular housing 32 communicates with an orifice 39 opening through the side of the valve housing. The orifice 39 itself communicates with the secondary supply passage 12b. Outwardly of the orifice 39 a piston 40 is slidably seated within the central opening in the tubular housing 32. The piston is surrounded by a sealing ring 41 to prevent the passage of hydraulic fluid past the piston and into the outward end of the internal chamber of the housing. The piston 40 has an inwardly extending stem bearing against the ball valve 37. The piston 40 is urged inwardly by a compression spring 42, one end of which bears against the piston 40 and the other end bears against the cap 35. Inward movement of the piston 40 is limited by the shoulder 43 on the interior of the housing 32. Escape of hydraulic fluid between the housing 32 and the walls of the valve receiving opening 13 is prevented by the sealing ring 44.

The inner end 33 and the outer end 44 of the valve housing 32 are separated by the mounting wings 45. These are apertured to receive the bolts 46 attaching the pressure regulating valve 31 to the plate 10.

Figure 7:
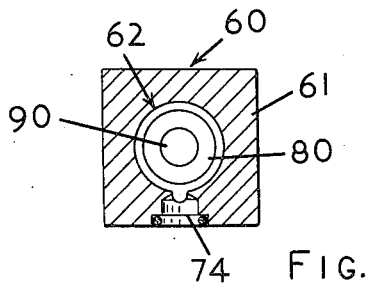
Fig. 7 is a sectional elevation view of the valve portion of my improved valve taken along the plane VII—VII of Fig. 4.

The manual valves 60 are designed to be mounted on the upper surface of the plate. One of these valves is used in conjunction with the group of ports including the ports 15, 18 and 22. A second of these valves is used in conjunction with the group of ports including the ports 16, 19, 23 and 25. The manual valve consists of a housing 61 (Fig. 7) having a longitudinal, circular, central, valve chamber 62. The ends of the valve chamber 62 are closed by the end plates 65 each having a circular boss 66 extending a short distance into the valve chamber 62 and cooperating with a ring seal 67. The end plates 65 are secured to the housing 61 by bolts 63. Each of the ends 65 has a centrally positioned bolt opening for a bolt 68. The bolts 68 engage the holes 70 in the plate 10 and constitute the only means assembling the manual valve 60 to the plate. This permits rapid assembly and disassembly of the manual valve and the plate.

Opening through the bottom of the manual valve 60 are the four port openings 74, 75, 76 and 77. Each of these port openings is designed to communicate with one of the ports extending through the top surface of the plate 10. Surrounding each of the port openings 74, 75, 76 and 77, where it will be in compressive contact with the plate 10, is a sealing member 78.

Slidably mounted in the valve chamber 62 is a tubular, sliding valve member 80. The valve member 80 is of such length that it extends across three of the port openings. The sliding valve 80 has a centrally located, external channel 81 (Figs. 4 and 6) of such width that it extends across two of the port openings. At the top center of the sliding valve 80 is a centrally apertured boss 82 (Fig. 6) designed to receive the lower end of the actuating handle 83. The wall of the valve chamber 62 is provided with a circumferential channel 84 communicating with the port opening 77. The wall of the valve chamber 62 is also provided with a second annular channel 85 communicating with the port opening 75.

The housing 61 has, at its center, an upstanding, externally threaded boss 86. This boss is closed by a cap 87 through which passes the actuating handle 83. The lower end of the actuating handle 83 is centrally apertured at 91 (Fig. 4). Slidably seating in the aperture 91 is a pin 92 having a ball on its lower end designed to seat in the boss 82 of the valve member 80. Seated in the aperture 91 and compressed by the pin 92 is a spring 93. The spring 93 keeps the pin 92 in engagement with the boss 82 as the handle 83 is rocked. The handle 83 has a generally spherical section at the center seating a cooperating chamber formed in the end of the boss 86 and the inside surface of the cap 87 supporting the handle 83 for pivotal movement. At the point of junction between the boss 86 and the cap 87, the handle is surrounded by a seal 88 to prevent leakage of hydraulic fluid.

*Operation*

The valve is in neutral position, that is, preventing any flow of hydraulic fluid through it when the handle 83 is vertical and the sliding valve 80 generally centered in the valve chamber 62, as shown in Fig. 4. When the handle 83 is rocked toward the end 11 of the plate 10, the slide valve 80 is moved in the opposite direction, opening the port opening 77 to the valve chamber 62. Simultaneously, the port openings 76 and 77 are interconnected by the exterior channel 81 of the slide valve. Hydraulic fluid entering through the supply passage 12 and the port opening 74 will pass through the central opening 90 in the slide valve 80 and be discharged through port opening 77. Fluid returning from the hydraulically actuated device will enter through the port opening 75 and be discharged through the port opening 76.

If the arm 83 is rocked in the opposite direction, moving the slide valve 80 toward the end 11 of the plate 10, the port opening 75 is uncovered permitting hydraulic fluid entering through the port opening 74 to be discharged through the port opening 75. At the same time the port openings 76 and 77 are interconnected by the channel 81, permitting free flow of hydraulic fluid between these port openings.

It will be seen that the handle 83 is always in a portion of the valve through which the fluid is being exhausted. As a result, the pressure of the fluid in this portion is slight, and the tendency to leak past the seal 88 is negligible. My valve is specifically designed to incorporate this advantage.

When the manual valve 80 is mounted on the side of the plate having the ports 15, 18 and 22, the port opening 76 is inoperative since there is no mating port in the plate. Thus, when the handle 83 is rocked toward the end 14, the ports 18 and 22 in the plate 10 are connected to permit hydraulic fluid returning via the port 22 and port opening 77 to be discharged through the port opening 76 and port 18 into the return passage 17. When the handle 83 is rocked in the other direction the ports 22 and 15 are connected through the valve member 80, permitting hydraulic fluid entering through the port opening 74 to be discharged through the port opening 77 and port 22. This arrangement is designed for operating an hydraulic device requiring hydraulic pressure to effect operation in one direction only. Operation in the other direction and return of the hydraulic fluid to the reservoir being effected by some other means such, as in the case of a snow plow, the weight of the plow, when being lowered, working against the hydraulic piston to lower the plow and force the hydraulic fluid from the cylinder. In this case, the hydraulic fluid enters via the line 100 and is both forced to an discharged from the cylinder 101 through the line 102 (Fig. 9).

The manual valve 60 mounted on the other side of the plate and seated over the ports 16, 19, 23 and 25 is designed to operate a mechanism in which hydraulic pressure is essential to induce operation of the device in both directions. When the sliding valve 80 is moved toward the end 14 of the plate, it directs the fluid entering through the line 100 to the hydraulic mechanism 103 through the hydraulic line 104 (Fig. 9). At the same time hydraulic fluid discharged from the hydraulic device 103 passes through the line 105 and is discharged from the valve through the return line 106. When the sliding valve 80 is rocked in the opposite direction, the flow through the lines 104 and 105 is reversed.

Sometimes it is desirable to operate hydraulic devices requiring different operating pressures but to obtain the hydraulic fluid for both devices from a single source to avoid duplication of equipment. The pressure regulating valve 31 makes this possible. With the pressure control valve 31 in place, the incoming hydraulic fluid, at a pressure high enough to effectively operate one hydraulic mechanism such as the cylinder 101, is made available through the port 15 to one of the manual valves 65 for operation of this cylinder. The spring 42 in the valve 31 will force the ball valve 37 open to permit the passage of hydraulic fluid from the supply passage 12 to the secondary supply passage 12b until there is sufficient pressure bearing against both the ball 37 and the face of the piston 40 to overcome the spring 42. When this occurs, the spring 42 will be compressed and the ball 37 will seat closing the valve 31 until the pressure in the secondary supply passage 12b is reduced to a point where the spring may again open the ball valve 37. Thus, the valve 31 allows passage of enough hydraulic fluid to meet the requirements of hydraulic equipment supplied through the secondary supply passage 12b but prevents the passage of this hydraulic fluid when the pressure in the secondary supply passage 12b exceeds the preset value determined by the degree of compression given to the spring 42 by the cap 35. A typical application of my invention is the case where the system is used to operate both snow plow and road grading equipment on a highway maintenance truck. In the case of the snow plow, the plow lifting cylinder 101 requires high pressures. Furthermore, if the pressure rises substantially above the normal operating level it is not of great significance. On the other hand, in the case of the hydraulic equipment for operating the scraper blade the pressures required are somewhat less than that required for operating the snow plow. It is also important that these pressures do not exceed predetermined, maximum values to prevent movement of the scraper blade and damage to the scraper blade operating mechanism or damage to the surface being graded. This is the purpose of the valve 31. By use of the valve 31, the source of hydraulic fluid may boost the pressures high enough to operate the snow plow without maintaining these high pressures in the scraper blade operating portion of the system.

My invention permits this to be done by the use of a simple and easily adjustable valve incorporated directly into the flow control valve where it is both readily accessible and permits the control valve to supply both sources without excess equipment. As the same time, if it is desired to eliminate the pressure differential, the pressure control valve 31 may be removed and a gasketed cap placed over the end of the valve receiving opening 13 to provide direct communication between the secondary supply passage 12b and the supply passage 12. Should it be necessary to replace the operating valve 31, it may be quickly removed and replaced by the installation of a comparatively inexpensive part readily adapted to replacement under field operating conditions. My valve design also has the advantage of permitting quick replacement of the manual valve 60 should this become necessary. Since the manual valve for each unit is an independent element, each may be separately replaced. The design also has the advantage of providing a fully integrated manual valve, thus permitting its replacement in the field with a minimum of operating delay. My invention has accomplished this flexibility of application and simplicity of operation through an exceedingly simple structure having a minimum of operating parts. This contributes substantially to the durability and dependability of the suit.

It will be recognized that various modifications of my invention may be made each without departing from the principle thereof. Each of these modifications is to be considered as included in the hereinafter appended claims unless these claims by their language expressly state otherwise.

I claim:

1. A valve receiving fluid under pressure from a source, said valve comprising: a base plate having a plurality of conduits therein; one of said conduits being a fluid supply conduit; a plurality of ports through one surface of said base plate; each of the others of said conduits communicating with one of said ports; said ports being arranged in two groups; one port in each of said groups communicating with said supply conduit; an opening through one end of said plate, said opening intersecting said supply conduit between said two ports; a tubular shell seated in said opening; said shell open at one end, said open end being in communication with the portion of said supply conduit between said shell and said source of fluid; a ball valve adapted to be urged into closing position by said fluid from said source of fluid; a piston in said shell; a plunger on said piston bearing against said ball; a spring acting against said piston and urging said plunger against said ball and said ball into valve opening position; said piston being acted upon by the fluid in the portion of said supply conduit remote from said source of fluid and urged by said fluid against said spring; a pair of control valves mounted on said base plate; each of said control valves operatively connected with one of said groups of ports.

2. A fluid regulating device comprising: a base plate having a plurality of conduits therein; a plurality of ports in one surface of said base plate, each of said ports communicating with one of said conduits; said ports being arranged in two groups; said base plate having means for connecting a pipe to each of said conduits; a pair of identical valves; each of said valves detachably secured to said base plate and operatively associated with one of said groups of ports; each of said valves having a central valve chamber; the wall of said chamber having a plurality of apertures therein, each communicating with one of said ports; a tubular valve element slidably mounted in said central valve chamber; said valve element, at its center, having a portion of reduced external diameter said portion being of sufficient width to embrace two of said apertures; means for slidably moving said valve element for selectively connecting pairs of said apertures.

3. A valve comprising: a tubular shell open at its inward end; a valve seat in said shell adjacent said inward end; a ball adapted to engage said seat and to open toward said inward end; a chamber in said shell outwardly of said valve seat; a spring biased piston in said chamber, said piston biased inwardly toward said ball; a plunger on said piston bearing against said ball; the wall of said chamber being apertured between said piston and said valve seat; a valve plate apertured at one end and having a plurality of conduits therein, each communicating with a port in one surface of said plate; a supply conduit communicating with a first port in said plate and with the inward end of said aperture in said end of said plate; said shell seated in said aperture in said end of said plate; a second port in said plate communicating with said aperture in said shell.

4. A valve as described in claim 3 wherein said ports are arranged in two groups; said first port being a member of one group and said second port being a member of the other group; a pair of distribution valves, each separately and detachably secured to said plate; one of said valves being operatively associated with each of said valve groups.

5. A valve receiving fluid under pressure from a source, said valve comprising: a base plate having a plurality of conduits therein; one of said conduits being a fluid supply conduit; a plurality of ports through one surface of said base plate; each of the others of said conduits communicating with one of said ports; said ports being arranged in two groups; one port in each of said groups communicating with said supply conduit; an opening through one end of said plate, said opening intersecting said supply conduit between said two ports; a pressure differential valve mounted in said opening; a pair of control valve housings mounted on said base plate; each of said control valve housings having an internal chamber; movable fluid directing and regulating means mounted entirely within said chamber; a plurality of ports in each of said control valve housings each of said ports communicating with said internal chamber; each of said ports aligned with one of said ports in said base plate.

References Cited in the file of this patent
UNITED STATES PATENTS

| | | |
|---|---|---|
| 2,275,963 | Herman | Mar. 10, 1942 |
| 2,367,115 | Goepfrich | Jan. 9, 1945 |

FOREIGN PATENTS

| | | |
|---|---|---|
| 509,023 | Great Britain | of 1939 |